United States Patent [19]
Martinez

[11] Patent Number: 5,208,446
[45] Date of Patent: May 4, 1993

[54] METHOD AND APPARATUS FOR VALIDATING CREDIT INFORMATION DURING HOME DELIVERY OF ORDER

[76] Inventor: Jerry R. Martinez, 5312 W. Tierra Buena, Glendale, Ariz. 85306

[21] Appl. No.: 762,398

[22] Filed: Sep. 19, 1991

[51] Int. Cl.$^5$ .............................................. G06K 5/00
[52] U.S. Cl. .................................. 235/380; 235/381
[58] Field of Search ................................ 235/380, 381

[56] References Cited

U.S. PATENT DOCUMENTS

| | | | |
|---|---|---|---|
| 4,868,900 | 9/1989 | McGuire | 235/380 |
| 4,870,259 | 9/1989 | Boggan et al. | 235/380 |
| 4,935,608 | 6/1990 | Tanaka | 235/380 |
| 5,053,606 | 10/1991 | Kimizu | 235/380 |
| 5,131,038 | 7/1992 | Pahl et al. | 235/380 |

*Primary Examiner*—William L. Sikes
*Assistant Examiner*—Scott A. Ouellette
*Attorney, Agent, or Firm*—Tod R. Nissle

[57] ABSTRACT

A method and apparatus for delivering an order to a home and utilizing credit information to verify and accept payment for the order. The method and apparatus verify credit information on site at the door of a home contemporaneously with delivery of an order.

3 Claims, 4 Drawing Sheets

METHOD AND APPARATUS FOR VALIDATING CREDIT INFORMATION DURING HOME DELIVERY OF ORDER

This invention relates to a method and apparatus for delivering an order to a home and utilizing credit information to verify and accept payment for the order.

In another respect, the invention relates to a method and apparatus for verifying credit information on site at the door of a home contemporaneously with the delivery of an order.

A wide variety of products are delivered to the home or business of a recipient and paid for when the product is delivered to the home or business. Pizza, chicken and other foodstuffs are ordered from a vendor by telephone and the vendor delivers the foodstuff to the home of the individual who placed the order. Office supplies and various other goods are ordered by a business from vendors, who then deliver the goods directly to the business. A particular problem which has long existed in such home or business delivery systems is that there is no ready way to verify at the time the goods are delivered credit information which the recipient of the delivered goods uses to pay for the goods. This is particularly the case when a vendors routinely delivers goods to a great many "one-time" recipients for which a vendor does not maintain an account, simply because maintaining an account is not practical or cost effective. In such deliveries to "one-time" recipients, the individual delivering the goods often must accept credit cards, check guarantee cards, and other credit information at face value because there is no practical way to evaluate on site the creditworthiness of such information.

Accordingly, it would be highly desirable to provide an improved method and apparatus for delivering goods to a home or business, the improved method permitting a delivery person to verify the creditworthiness of a credit card, bank guarantee card or other credit information provided by the recipient of the goods while the delivery person stands at the door of the home or business of the recipient to deliver goods to the recipient.

Therefore, it is a principal object of the invention to provide an improved method and apparatus for delivering goods to a home or business and for, while at the door of the home or business, verifying the creditworthiness of a credit card, bank guarantee card, or other credit information provided to the delivery person by the recipient of the goods.

Another object of the invention is to provide an improved method and apparatus for the home delivery of goods which, after a delivery person has left his vehicle, utilizes data entered by the delivery person at the door of the residence of the recipient of the goods, utilizes an airborne transmission of the data entered, and utilizes a cellular telephone line to contact a host computer to validate credit information provided the delivery person by the recipient of the goods.

A further object of the invention is to provide an improved method and apparatus for the home delivery of goods which can, contemporaneously with the delivery of goods to a recipient, provide the recipient with a printed receipt confirming delivery of the goods and the recipient's validated payment for the goods.

These and other, further and more specific objects and advantages of the invention will be apparent to those skilled in the art from the following detailed description thereof, taken in conjunction with the drawings, in which.

Briefly, in accordance with my invention, I provide a home delivery system for validating credit tendered to a delivery person when the person delivers an order to a recipient at a residence. The home delivery system includes a host computer with memory means for storing credit validation data; portable housing means carried by the delivery person; credit data entry means mounted in the housing means for entering credit information concerning the recipient; data processing means mounted in the housing means and coupled with credit data entry means for storing the credit information; first transmission means mounted in the housing means and operatively associated with the data processing means to transmit the credit information from the portable housing means over a cellular telephone line and to said host computer for examination to generate validation information indicating whether the credit information is acceptable; receiver means mounted in the housing and operatively associated with the data processing means; printer means mounted in the housing and operatively associated with the data processing means; and, second transmission means operatively associated with the host computer for transmitting the validation information to the receiver means to generate validation information signals from the receiver means to the data processing means. When the validation information signals indicate the credit information is acceptable, the data processing means activates the printer to print a receipt for the recipient to confirm that the order was delivered to the recipient and paid for by the recipient.

In another embodiment of the invention I provide a method for delivering an order to a home and utilizing credit information to accept payment for the order. The method includes the steps of delivering the order to a recipient at the door of a designated residence; transmitting, from a location at the door of the residence, credit information concerning the recipient over a cellular telephone line and to a host computer for examination by the host computer to generate validation information indicating whether the credit information is acceptable; transmitting to a location at the door of the residence the validation information; and printing, at a location at the door of the residence and when the validation information signals indicate the credit information is acceptable, a receipt for the recipient to confirm that the order was delivered to and paid for by the recipient.

Figure 1:
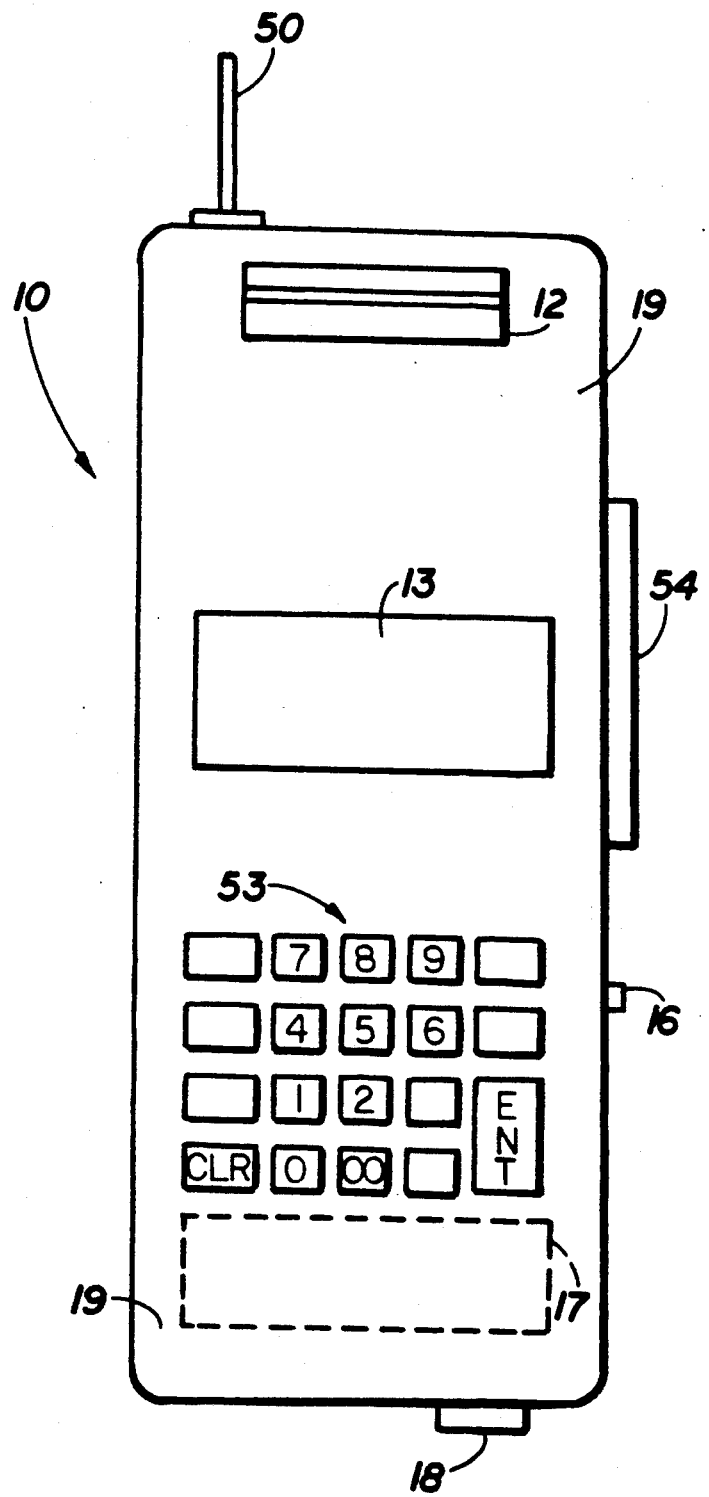
FIG. 1 is a top view of a portable credit validation unit utilized by a delivery person in the practice of the invention.

Turning now to the drawings, which depict the presently preferred embodiments of the invention for the purpose of illustrating the practice thereof and not by way of limitation of the scope of the invention and in which like reference characters represent corresponding elements throughout the several views, FIG. 1 illustrates a portable credit validation unit constructed in accordance with the principles of the invention and generally identified by reference character 10. Unit 10 includes a hollow rectangular housing 19. Mounted in housing 19 are a transmitting/receiving antenna 50, printer 12, LCD screen 13, magnetic credit card reader 54, data entry keyboard 53, fiber optic data wand input/output port 16, rechargeable battery pack 17, and socket 18 for recharging battery pack 17. A microprocessor or other data processing means is also carried in housing 19 and is operatively associated with antenna 50, printer 12, screen 13, credit card reader 54, keyboard 53, and port 16.

Figure 2:
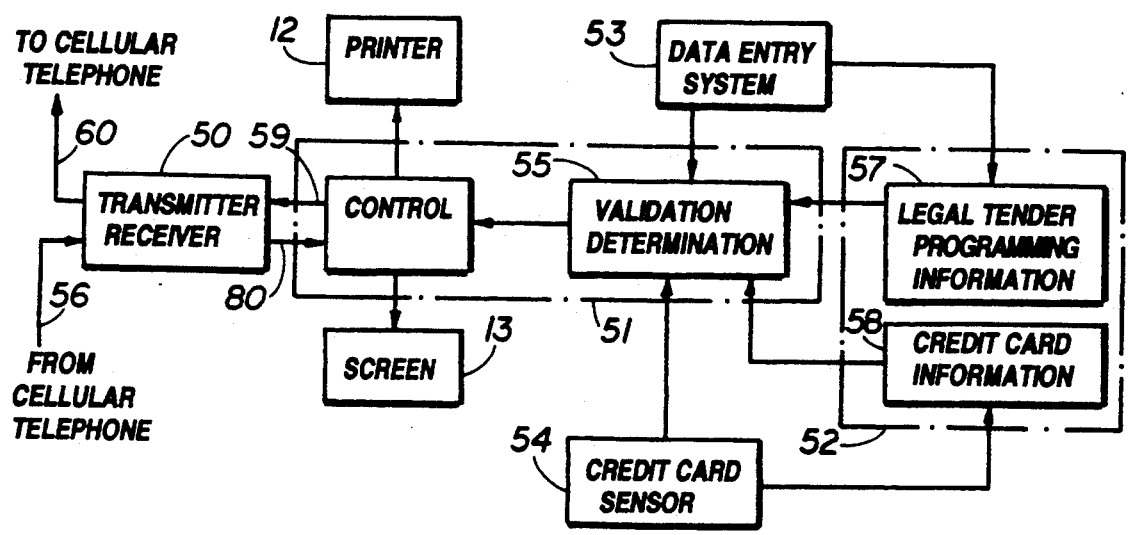
FIG. 2 is a block diagram illustrating the components of the portable unit of FIG. 1.

FIG. 2 illustrates the interrelationship between the various components of unit 10. The microprocessor in unit 10 includes a memory 52 and control 51. The keyboard or other data entry system 53 is used to program the microprocessor or input card account numbers, bank card account numbers, or other credit information to be validated by the system of the invention. Magnetic credit card sensor 54 can also be used to enter credit card or bank card account numbers into memory 52 as credit card information 58. Data inputted by system 53 is stored in memory 52 as legal tender or programming information 57. When credit card information including the card number, expiration date, cardholder name, etc. is entered into memory 52 by sensor 54 and the user wishes to validate the credit card number, the user presses a selected button on keyboard 53 or otherwise prompts controller 51 to generate and transmit signals 59 to transmitter-receiver 50. Signals 59 include the credit card information. Transmitter 50 transmits 60 the signals 59 to the cellular telephone network of FIG. 4 or to another selected communications network. The cellular telephone network of FIG. 4 receives and transmits signals 59 to a host computer 102 which validates the credit card information and other data associated with the credit card. Computer 102 then generates validation signals which are transmitted through the cellular telephone network, back to the cellular telephone and back 56 to the transmitter-receiver 50. The validation signals are transmitted 80 from transmitter 50 to control 51. If the validation signals 80 indicate that the credit card information is acceptable, control 51 directs the words "AUTHORIZATION RECEIVED" to appear on screen 13 and also directs printer 12 to print a paper strip receipt. The receipt indicates the credit card, bank card or other legal tender used to pay for the delivery; the credit card authorization number, if appropriate; the total cost of the order; and, when the printed strip includes two pieces of paper (one for the customer and one for the delivery person), can include a signature line for the customer in the event the customer is paying with a credit card.

If the validation signals 80 indicate that the credit card information is not validated and is not acceptable, control 51 directs the word "DECLINED" to appear on screen 13 and does not direct printer 12 to print a receipt.

Figure 3:
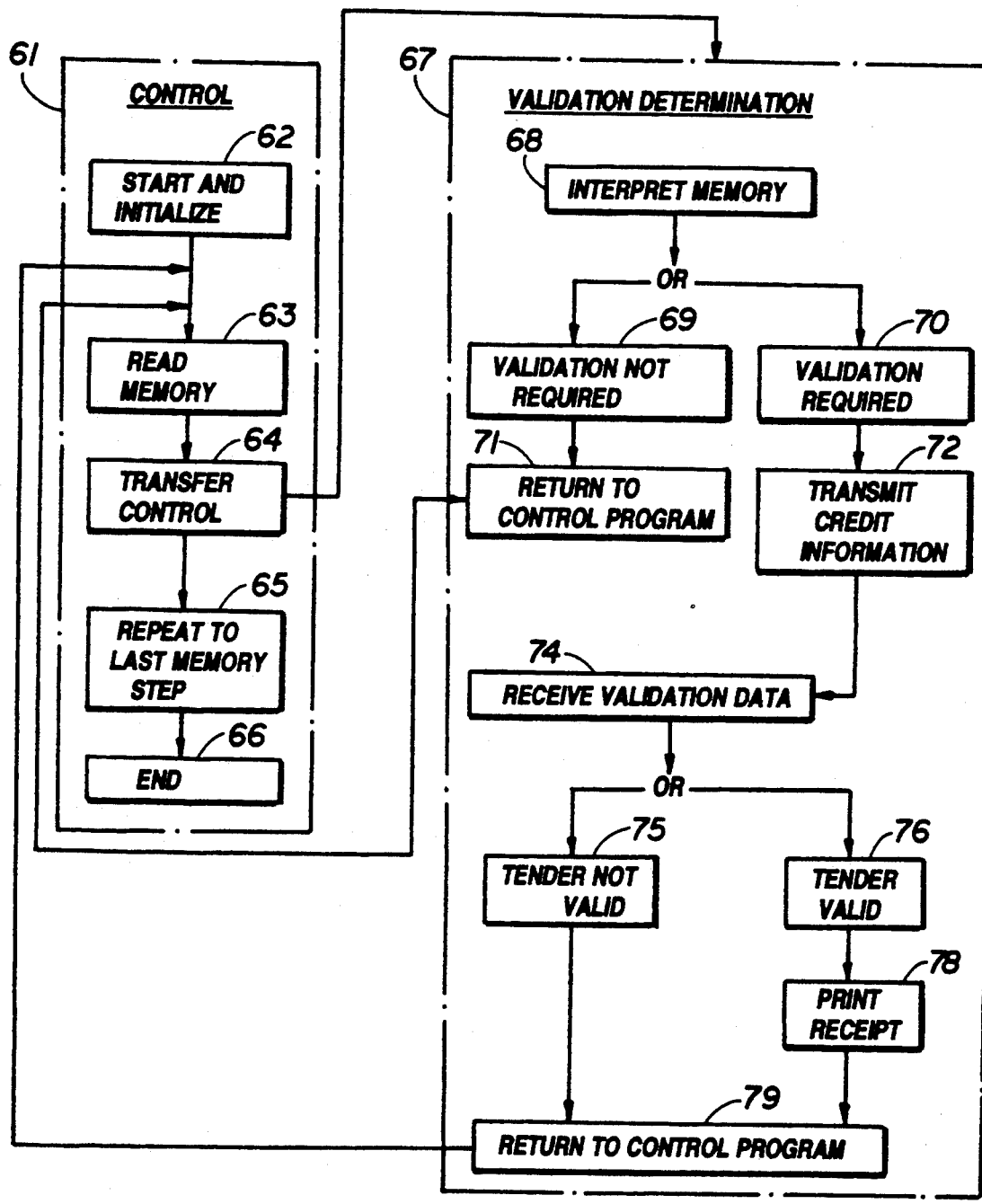
FIG. 3 is a logic flow diagram illustrating the mode of operation of software which can be utilized in the unit of FIG. 1; and, FIG. 4 is a block diagram illustrating a cellular telephone system utilized in the invention.

FIG. 3 is a block flow diagram which illustrates a typical program or logic function which is executed by the controller for validating a credit card number or other credit information which is provided to a delivery person by the recipient of the order delivered by the delivery person. The basic control program 61 consists of commands to "start and initialize" 62, "read memory" 63 and "transfer control" 64 to the validation determination subroutine 67.

The validation determination sub-routine 67 includes a command to "interpret memory" 68 (i.e., determine if there is a credit card or other information in memory which must be validated). If "validation is not required" 69 then the "return to control program" 71 program step exits the sub-routine 67. If "validation is required" 70 of a credit information, then "transmit credit information" step 72 causes control 51 to transmit information 59 to transmitter 50 and to direct transmitter 50 to transmit credit information signals 60 by radio wave or other airborne electromagnetic radiation to the cellular telephone in the delivery person's delivery vehicle. The cellular 130 telephone receives the transmitted signals 60, autodials, and sends the credit information contained in the signals 60 over a cellular telephone line in the manner illustrated in FIG. 4. If desired, the information in signals 60 can be transmitted to a microwave station instead of telephone 130 and can then be transmitted into a telephone or other communication system for transmission to a host computer. After the host computer 102 in the cellular telephone system of FIG. 4 validates the credit card information, the validated information signals are transmitted back through the cellular telephone system to the cellular telephone in the vehicle of the delivery person. The cellular telephone in the vehicle includes a transmitter which transmits via the air validation information signals 56 to transmitter-receiver 50. When the controller "receives validation data" 74 and the validation data confirms that the credit card or other tender is "not valid" 75, then the "return to control program" step 79 exits the validation determination routine. As earlier noted, if the validation data reviewed by controller 51 indicates that the credit information is not acceptable, then controller 51 can also direct screen 31 to display "DECLINED". If the validation data reviewed by controller 51 indicates that the credit card or other tender is "valid" 76, then the command "print receipt" 78 causes printer 12 to print a receipt for the recipient of the order. The receipt can include the total cost of the order, the credit card or bank card number used to pay for or confirm the order, the date, and a space for the recipient of the order to sign in the event the recipient is paying with a credit card. The "print receipt" command 78 is followed by "return to control program" 79. The control program 61 and the validation determination sub-routine are repeated as indicated by the "repeat to last memory" step 65 of the control program 61 followed by and "end" program step 66 which completes execution of the program.

Figure 4:
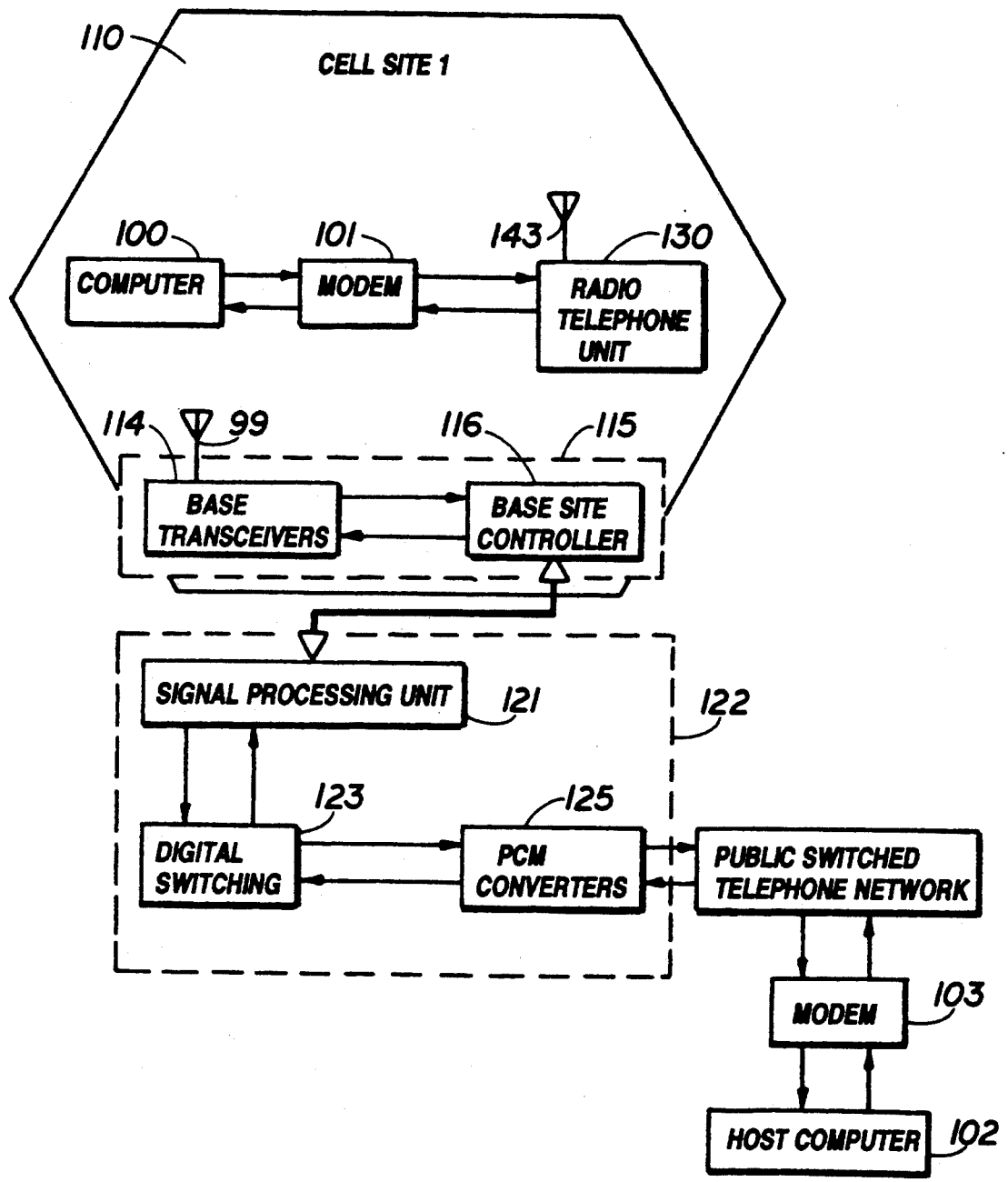

FIG. 4 illustrates a cellular system which, in simplified form, includes base site equipment for a plurality of geographical radio frequency (RF) coverage areas (cells), including cell 110. For cell 110, the base site equipment 115 includes a set of base transceivers 114 and a base site controller 116.

Radio telephone unit 130 is normally carried in a vehicle and is operatively associated with computer 100 and modem 101. A facsimile machine (fax) or other similar machine which inputs data to a modem 101 or its functional equivalent for transmission by unit 130 can be substituted for computer 100.

Overall control of the base site equipment 115 is provided by a signal processing unit 121 of a cellular switch controller 122. The switch controller 122 also includes a digital switching network 123 for controlling the call switching operation between a public switched telephone network (PSTN) and the base site equipment 115. A set of pulse coded modulation (PCM) converters 125 are included in the cellular switch controller 122 as an interface to the PSTN 131. The PSTN communicates with a modem 103 and host computer 102 which receives telecomputer data originally generated by computer 100 and transmitted by unit 130. The host computer 102 includes databases and programming which are utilized to examine and validate credit information transmitted through the cellular telephone system from antenna 143 to computer 102. Signals from antenna 143 are received by antenna 99 and vice-versa.

In use, a delivery person is given an order to be delivered to a recipient at a selected home, business or other residence. The vehicle utilized by the delivery person includes a cellular telephone. When the delivery person arrives at the residence he leaves his vehicle and takes the order to the door of the residence. At the door the delivery person receives a credit card or bank guarantee card (for a check written by the recipient of the order). The delivery person uses keyboard 53 or card reader 54 to input the recipient's credit information into unit 10. Once the credit information is input, the delivery person presses a button or buttons on keyboard 53 or otherwise prompts controller 51 to transmit the credit information via transmitter 50 and the cellular telephone system to host computer 102 for validation. After host computer 102 examines the credit information, it prepares validation information which is transmitted back through the cellular telephone system or some other communication system to transmitter-receiver 50. Validation information signals 80 from transmitter-receiver 50 are analyzed by controller 51. If the validation information signals 80 indicate that the recipient's credit information is acceptable, then printer 12 produces a receipt for the recipient, screen 13 displays "AUTHORIZATION RECEIVED", the delivery person has the recipient sign the receipt (in the event the recipient paid with a credit card), and the delivery person gives the order to the recipient. If the validation information signals 80 indicate that the recipient's credit information is not acceptable, the screen 13 displays "DECLINED" and the recipient can give the delivery person other tender to pay for the order. After the order is paid for and delivered, the delivery person carries unit 10 back to his vehicle and drives the vehicle back to his place of business.

Having described my invention and the presently preferred embodiments thereof in such terms as to enable those skilled in the art to understand and practice it, I claim:

1. In a home delivery system for validating credit tendered to a delivery person when the person delivers an order to a recipient at a residence,
    (a) a host computer with memory means for storing credit validation data;
    (b) portable housing means carried by the delivery person;
    (c) credit data entry means mounted in said housing means for entering credit information concerning the recipient;
    (d) data processing means mounted in said housing means and coupled with said credit data entry means for storing said credit information;
    (e) first transmission means mounted in said housing means and operatively associated with said data processing means to transmit said credit information from said portable housing means over a cellular telephone line and to said host computer for examination to generate validation information indicating whether said credit information is acceptable;
    (f) receiver means mounted in said housing and operatively associated with said data processing means;
    (g) printer means mounted in said housing and operatively associated with said data processing means; and,
    (h) second transmission means operatively associated with said host computer for transmitting said validation information to said receiver means to generate validation information signals from said receiver means to said data processing means, said data processing means, when said validation information signals indicate said credit information is acceptable, activating said printer to print a receipt for the recipient to confirm that the order was delivered to the recipient and paid for by the recipient.

2. In a method for delivering an order to a residence and utilizing credit information to accept payment for the order,
    (a) delivering the order to a recipient at the door of a designated residence;
    (b) transmitting, from a location at the door of the residence, credit information concerning the recipient to a host computer for examination by the host computer to generate validation information signals indicating whether said credit information is acceptable;
    (c) transmitting said validation information signals to said location at the door of the residence; and,
    (d) printing, at said location at the door of the residence and when said validation information signals indicate said credit information is acceptable a receipt for the recipient to confirm that the order was delivered to and paid for by the recipient.

3. In a method for delivering an order to the recipient of a home and utilizing credit information from the recipient to accept payment for an order,
    (a) transporting the order in a vehicle to a designated residence, said vehicle including a cellular telephone;
    (b) collecting, at a location distal from the vehicle and at the door of the residence, credit information tendered by the recipient in paying for the order;
    (c) transmitting said credit information from said location to said cellular telephone in said vehicle;
    (d) transmitting said credit information from said cellular telephone over a cellular telephone line and to a host computer for examination by the host computer to generate validation information indicating whether said credit information is acceptable;
    (e) generating validation information signals carrying said validation information;
    (f) transmitting said validation information signals to said location; and,
    (g) printing at said location, when said validation information signals indicate said credit information is acceptable, a receipt for the recipient to confirm to the recipient that the order was delivered to and paid for by the recipient.

* * * * *